No. 10,358.
PATENTED JAN. 3, 1854.
A. C. COOK.
MACHINE FOR SAWING BEVEL SURFACES.
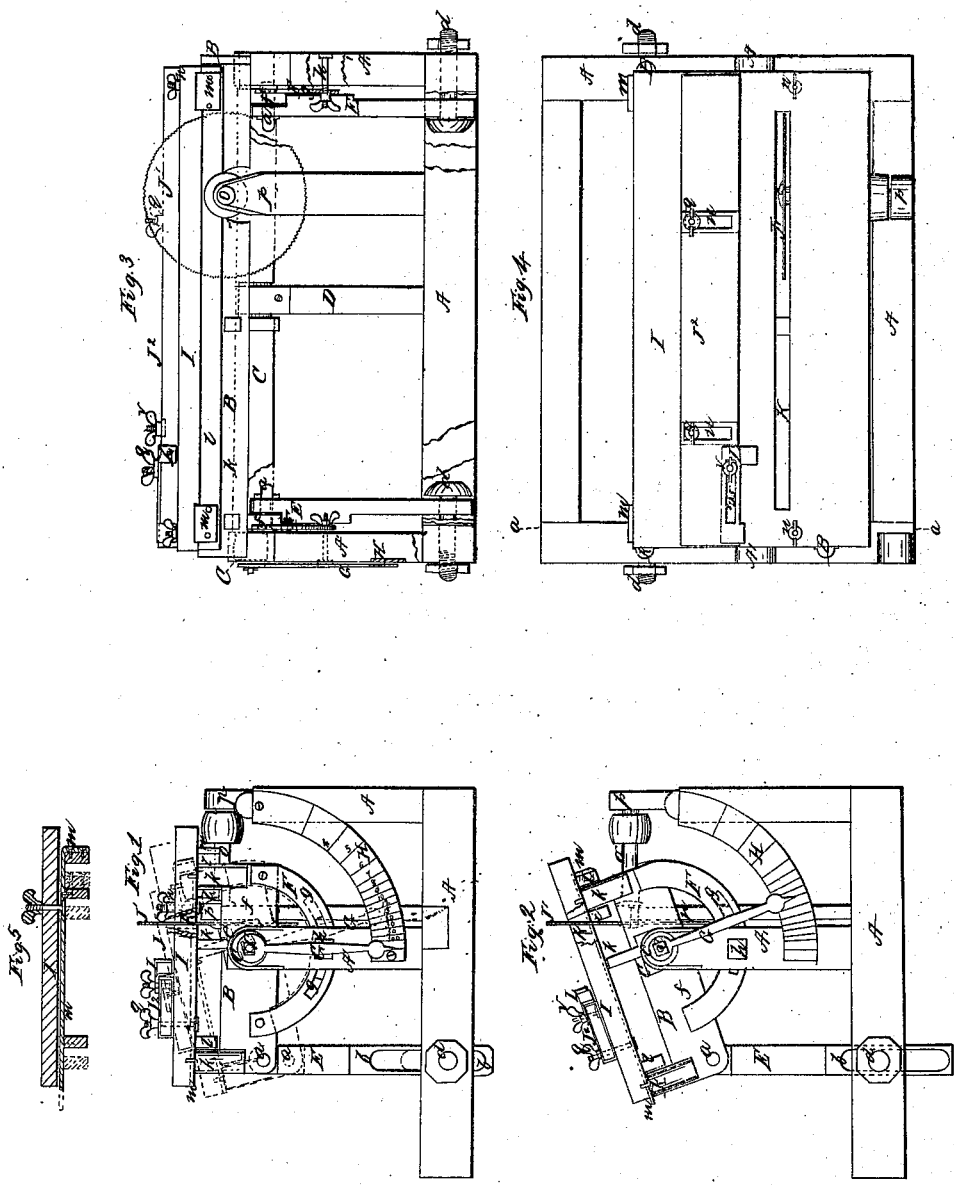

UNITED STATES PATENT OFFICE.

ALFRED C. COOK, OF RUSSELVILLE, KENTUCKY.

MACHINE FOR SAWING BEVEL SURFACES.

Specification of Letters Patent No. 10,358, dated January 3, 1854.

*To all whom it may concern:*

Be it known that I, ALFRED C. COOK, of Russelville, in the county of Logan and State of Kentucky, have invented a new and useful Machine for Cutting or Sawing Bevels of Every Description to Form Miter, Stave, and other Joints, which I denominate the "Adjustable Bevel Gaging and Indicating Platform;" and I do hereby declare that the following is a full, clear, and exact description of the same, reference being had to the accompanying drawings, forming part of this specification, in which—

Figure 1, is a view of that end of the machine which has the index and pointer arranged on it; in this view the red lines illustrate the bevel position of the platform, while the black lines designate its horizontal position. Fig. 2, is also a view of the same end of the machine. The platform in this view being shown by black lines in an inclined or bevel position and the pointer moved to one of the numbers on the index plate. Fig. 3, is a side elevation of the machine—a portion of the frame being broken away to show the manner in which the platform is suspended and allowed to turn on its center. Fig. 4, is a plan or top view of the same, showing the sliding carriage, its adjustable rest, and dog or stop. Fig. 5, is a vertical transverse section of the sliding carriage through the line $a$, $a$, in Fig. 4. This view shows the manner in which the guide rails of the said carriage are adjusted to suit the bevel at which the platform is set. The red lines showing the manner of adjustment.

Similar letters of reference in each of the several figures indicate corresponding parts.

The nature of my invention consists in an adjustable swinging bevel gaging platform or bench which is supported by a strong stationary frame. The top of said platform serving as a carriage for feeding the stuff in an angular or straight direction up to a saw passing up through and working in a long slit in the carriage as it is moved back and forth over the adjustable platform. The guide pieces or side rails of this carriage being made adjustable to allow the platform to be adjusted to suit any description of bevel desired to be cut. And the side rest and dog against which the stuff lies or rests being also adjustable so as to cut any desired flare or give the stuff any angle lengthwise that may be desired. The shaft upon which this platform swings being provided with a needle or index pointer on one of its square ends which pointer is moved to a certain number on an index plate, attached to one end of the stationary frame, as the platform is adjusted to give a certain bevel; the said plate or index scale being set to suit the kind of work being done and can be marked out so as to indicate any angle or bevel from a right angle to any angle desired.

To enable others skilled in the art to make and use my invention I will proceed to describe its construction and operation.

This machine may be used in connection with either a circular or upright saw, or with horizontal planes, worked by a pitman, slide and fly wheel or otherwise. I shall however only describe it as applied to a circular saw, as that is the one shown in the drawing.

A, represents the main frame which sustains the swinging platform.

B, is the swinging platform, made adjustable and turning on and with the central or main shaft C, which extends entirely across the main frame and rests in recesses cut in the top of the three main supporting posts A' and D, as seen in Figs. 1, 2, and 3. This platform is attached by each of its ends, on one side, to sword pieces or arms E, E, by pins $a$, $a$, which serve as the fulcra for said platform to turn upon at this point. The sword arms having slots $b$, cut in them for the set screws $d$, $d$, to work in when it is desired to raise or lower the said arms and the platform—these set screws serving with the arms to retain the platform in a fixed horizontal or inclined position and the arms allowing the platform to be susceptible of any desired adjustment, as will be evident from the drawing Figs. 1 and 2.

F, F, are segmental braces let into the two end or cross pieces $f$, $f$, of the movable platform; these braces each have a segmental shape slot $g$, cut in them, for the set screws $h$, $h$, to work in as the platform is moved in the path of a vertical circle, as shown in Fig. 1, by red lines—these braces serve to assist the sword arms in keeping steady the platform after it has been turned to the inclined position shown in Fig. 2. The set screws being tightened after the platform is set to cut the proper bevel. By turning the platform to the position shown by red lines in Fig. 1, the board J, shown by blue lines will be cut at an angle as is evident from the drawing, for the saw always maintains its vertical position.

G is the pointer or needle secured fast on the square end of the main shaft C, as seen in Figs. 1 and 2; this needle moves with said shaft and points to the numerals on the index plate H, as seen in Figs. 1 and 2. As the platform is adjusted to give a bevel of 45°, the pointer is moved to the numerals which designate such an angle on the index plate, and so on, just according to the desired bevel being cut. This index plate may be set so as to give the very slightest as well as the greatest angle and the operation of cutting joints for staves of all kinds of cooperage is thus controlled very effectually, also every description of bevel employed in joinery may be cut with ease and facility.

I, is the feed carriage. It slides over the ways $k, k$, the rails $l, l$, guiding and keeping it on the said ways. These rails $l, l$, are adjustable by the slide plates $m, m$, and set screws $n, n$, which plates are set transversely in the bottom and near each end of the carriage and slide freely in their seats; these rails are made adjustable so as to allow the platform to be set at the greatest angle desired. The necessity of this adjustment will be seen in Fig. 1, for as the platform is adjusted the face of the saw J', is brought very near the edge of the slot K, in the carriage and that the saw is prevented from turning freely until these rails and carriage are moved toward it and the saw consequently made to have a place directly in the center of the slot. The saw has no lateral movement whatever and only has a rapid revolving motion it being secured on the arbor $o$, which turns in the top of the supporters, $p, p$. A pulley being secured on arbor for giving motion to the saw.

$J^2$, Fig. 4, is the side rest against which the stuff lays while being sawed. This rest is made adjustable by the screws $q, q$, which work in the slots $u, u$, in said rest; by the use of this rest in connection with the adjustable platform—the flare and bevel of staves may be cut at the same time for it will be evident that this rest can be set at any angle desired by the slots and set screws. By having this rest to turn on a pivot in its center the same object can be effected. The pivot also serving as a set screw as well as a fulcrum.

L, is the heel rest or dog for the end of the board to rest against, this is attached to the side rest and is also adjustable by the set screw $v$, and slot $w$, as seen in Fig. 4. This machine is very simple and cheap and it effects a great saving in time and labor.

What I claim as my invention and desire to secure by Letters Patent, is—

The employment in the manner herein described of an adjustable swinging bevel gaging platform provided with a sliding carriage I, which has adjustable guide rails $l, l$, and adjustable heel and side rest J, and L; and pointer G, in combination with an index plate H, and cutter J'; the whole being constructed, arranged and operating in the manner and for the purpose herein described.

ALFRED C. COOK.

Witnesses:
W. I. MORTON,
WM. L. WEBB.